United States Patent [19]

Cardenas et al.

[11] 4,213,500

[45] Jul. 22, 1980

[54] OIL RECOVERY PROCESS: INJECTION OF FATTY ALCOHOL FOLLOWED BY SOAP

[75] Inventors: Ricardo L. Cardenas; Joseph T. Carlin, both of Houston, Tex.

[73] Assignee: Texaco Inc., White Plains, N.Y.

[21] Appl. No.: 918,756

[22] Filed: Jun. 26, 1978

[51] Int. Cl.$^2$ ............................................. E21B 43/22
[52] U.S. Cl. ................................ 166/273; 252/8.55 D
[58] Field of Search ................... 252/8.55 D; 166/273, 166/274

[56] References Cited

U.S. PATENT DOCUMENTS

| | | | |
|---|---|---|---|
| 3,208,515 | 9/1965 | Meadors | 166/274 |
| 3,208,517 | 9/1965 | Binder et al. | 166/274 |
| 3,330,344 | 7/1967 | Reisberg | 166/273 |
| 3,373,809 | 3/1968 | Cooke | 166/274 X |
| 3,796,266 | 3/1974 | Carlin et al. | 166/274 X |

FOREIGN PATENT DOCUMENTS 899230  5/1972  Canada .................................... 166/273

*Primary Examiner*—Herbert B. Guynn
*Attorney, Agent, or Firm*—Carl G. Ries; Thomas H. Whaley; Gregory A. Cone

[57] ABSTRACT

An oil recovery process comprising injecting a fatty alcohol into the oil phase of the reservoir followed by the injection of a soap which effectively emulsifies the oil-fatty alcohol mixture followed by further water injection to displace and produce the emulsified oil.

4 Claims, 1 Drawing Figure

OIL RECOVERY PROCESS: INJECTION OF FATTY ALCOHOL FOLLOWED BY SOAP

BACKGROUND OF THE INVENTION

1. Field of the Invention

This invention relates to the recovery of petroleum from a subterranean reservoir by the injection of fatty alcohol followed by the injection of soap.

2. Description of the Prior Art

The crude oil which accumulates in subterranean reservoirs is normally produced initially by so-called "primary recovery" techniques which utilize only the natural forces present in the reservoir environment. However, upon depletion of these natural forces a major portion of the crude oil remains trapped within the reservoir rocks. Also some petroleum reservoirs cannot be produced by reliance on natural forces alone. Recognition of the large amount of crude oil remaining in such reservoirs has led to the development of a number of "enhanced recovery" techniques which are designed to economically recover additional quantities of this remaining oil.

The most common enhanced recovery technique is that of "waterflooding" in which an aqueous solution is injected into the reservoir under pressure sufficient to drive the solution through the reservoir and out through production wells so as to effect a displacement of the petroleum from the rock pores and a driving of this oil by the waterflood to the producing wells. Economics dictate that waterflooding can only be used advantageously when the cost of the equipment, water and any additional chemical additives is less that the value of the oil recovered by the process. Accordingly, the efficiency of the waterflood is critical to the success of the process.

Probably the single most important obstacle that an effective waterflood must overcome is the high interfacial tension between water and oil. This causes in part the capillary retention of the oil within the pores of the reservoir rock and prevents the displacement of the oil droplets by water under the pressures feasible in reservoir flooding processes. In consequence, various aqueous surfactant systems have been proposed for use in enhanced recovery waterflooding methods. Their object is to reduce the interfacial tension between oil and water from a characteristic value of about 35 dynes per centimeter to a value of something less than one dyne per centimeter. By employing techniques well known in the art, many of these surfactant flooding processes are not effective at common reservoir brine concentrations however. Such surfactant processes can be used both during initial waterflooding operations and after the reservoir has "watered-out".

Spontaneous emulsion flooding is a particular method of enhanced oil recovery that operates by creating an emulsion by the action of the aqueous flooding solution on the in place oil. The process simultaneously lowers the interfacial tension and creates an oil-in-water emulsion. Spontaneous emulsion flooding can be accomplished with certain crude oils containing natural emulsifiers by flooding with alkaline water. Such crude oils are usually in the lower API gravity range. Most crudes do not contain the necessary emulsifiers, however, and there is a substantial need for processes that will extend the usefulness of the spontaneous emulsion technique to include the higher API gravity oils.

SUMMARY OF THE INVENTION

The method of this invention comprises injecting into a reservoir containing petroleum which does not contain sufficient natural emulsifiers to support spontaneous emulsification a slug containing fatty alcohol followed by a a slug containing soap. The emulsion formed thereby is then swept through the reservoir by further water injection and is recovered by one or more producing wells.

DESCRIPTION OF THE PREFERRED EMBODIMENT

Figure 1:
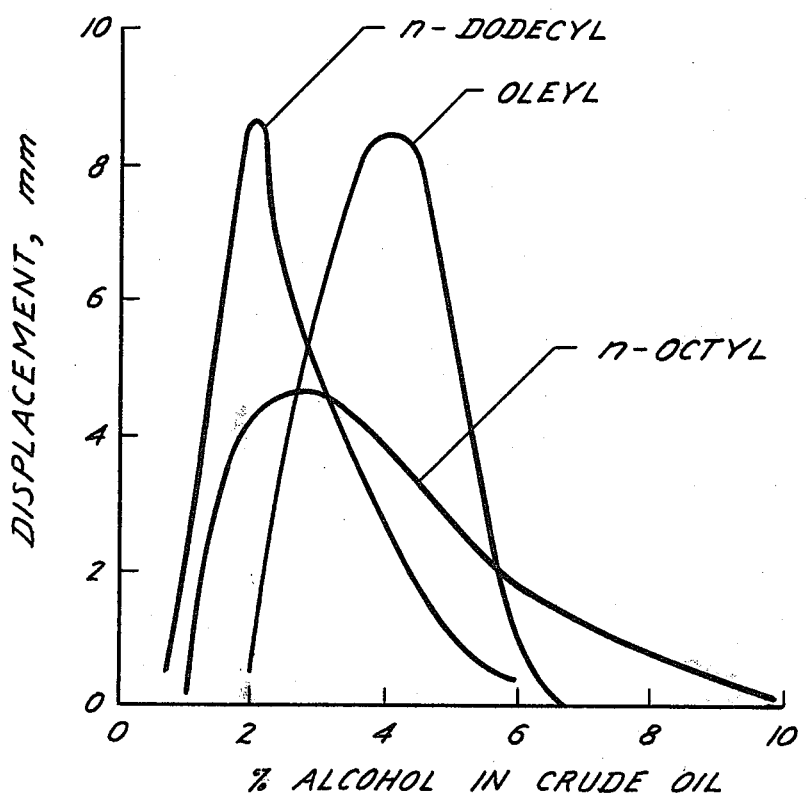
FIG. 1 shows the oil recovery effectiveness of three different fatty alcohols, n-octyl, n-dodecyl and oleyl, at varying concentrations in Salem crude oil measured as the distance the oil is displaced from a capillary tube in 5 minutes by an aqueous solution of 1% sodium dodecyl sulfate and 1.1% sodium chloride.

This invention discloses a method for recovering crude oil from a subterranean reservoir containing brine by injecting fatty alcohol followed by soap to form an oil in water emulsion. This emulsion is recovered by continued water injection which forces the emulsion through the formation and out through the producing wells.

Two advantages are readily apparent in this method. First, the oil-in-water emulsion formed has significantly greater viscosity than does water alone, leading to a much more favorable mobility ratio between the displacing and the displaced fluids, a factor that indicates a more efficient sweep of the reservoir by the displacing water flood. A second advantage of this method is that it will function in the presence of brine. This is especially important because it eliminates the need for the involved and expensive procedures that must be undertaken to condition a brine-containing oil reservoir for treatment by brine-intolerant enhanced oil recovery techniques.

The first step of this invention comprises the injection of fatty alcohol into the petroleum reservoir. The alcohol combines with the oil in place to form a mixture that will readily emulsify when contacted with an aqueous surfactant solution containing soap. Of the many fatty alcohols tested, those found effective include heptyl, octyl, nonyl, decyl, undecyl, dodecyl, hexadecyl and oleyl alcohol. Additionally, two branched alcohols, 2-octyl and 2-decyl, were found to be effective. Especially preferred are the straight chain fatty alcohols containing from 8 to 16 carbon atoms and oleyl alcohol. Effective concentration of the fatty alcohol can vary from about 0.1 to about 10 weight percent with the preferred range being from about 0.5 to about 4 weight percent.

Anyone of a number of different soaps can be used in the method of this invention. Sodium dodecyl sulfate was found to be especially effective in emulsifying the oilalcohol mixtures. One important criterion that the soap should satisfy is that it should be brine tolerant. The sodium dodecyl sulfate systems tolerated sodium chloride concentrations up to and exceeding 3%. The effective concentration of the sodium dodecyl soap can range from 0.05 to 5% by weight. The preferred range is from about 0.2 to about 2.0% by weight.

The oil recovery effectiveness of this invention was tested by both capillary displacement and core flooding techniques. Both tests used crude oil from the Salem Unit, Marion County, Illinois and matched the salt concentration encountered there at 2.2% sodium chloride. Additionally, The core floods utilized cores from the Salem Aux Vases Formation.

In the capillary displacement tests the aqueous phase, containing sodium dodecyl sulfate and brine, displaced Salem crude oil containing a fatty alcohol from the capillary. Favorable concentrations of the chemical components were taken at the maximum distance oil was displaced from the capillary in five minutes.

FIG. 1 reports the capillary displacement of Salem crude oil combined with three different fatty alcohols in varying concentration when displaced by an aqueous phase comprising 1% sodium dodecyl sulfate and 2.2% sodium chloride. Table 1 lists the fluid properties of this system.

TABLE 1
FLUID PROPERTIES

Oil Phase - Salem Crude Oil
Gravity, °API 36.0
Viscosity, 75° F., cp 5.7
Aqueous Phase - Water, 2.2% Sodium Chloride, 1% sodium dodecyl sulfate
Viscosity, 75°, cp 0.96
Interfacial Tension

| Components | Interfacial Tension dynes/cm |
|---|---|
| Salem crude + distilled water | 20.2 |
| Salem crude + water, 2.2% Sodium chloride | 20.2 |
| Salem crude, 2% Oleyl alcohol + water, 2.2% sodium chloride | 16.7 |
| Salem crude + water, 1% sodium dodecyl sulfate, 2.2% sodium chloride | 0.29 |

The core floods were conducted in Salem Aux Vases cores. For each flood the cores were evacuated and completely filled with water which was then displaced with stock tank Salem crude oil to obtain the initial oil saturation. Water floods were performed until high water-oil ratios were obtained. Following each water flood, 0.1 pore volume of a fatty alcohol-oil mixture was injected into the core, followed by a brine-soap mixture. The fatty alcohol-soap injection sequence was continued until another high water-oil ratio was obtained. The description of the components of each chemical flood are listed in Table 2 and the results of each flood are listed in Table 3.

TABLE 2

| Flood Number | CORE FLOOD COMPONENTS Description - Fluids Injected |
|---|---|
| 1 | 0.1 pore volume of 2% dodecyl alcohol - 98% Salem crude mixture followed by 1% sodium dodecyl sulfate in 2.2% sodium chloride aqueous solution. |
| 2 | 0.1 pore volume of 96% butane - 4% oleyl alcohol mixture followed by 1% sodium dodecyl sulfate in 2.2% sodium chloride aqueous solution. |
| 3 | 0.1 pore volume 95% Salem crude - 5% oleyl alcohol mixture followed by 1% sodium dodecyl sulfate in 2.2% sodium chloride solution. |

TABLE 3
CORE FLOOD DISPLACEMENT RESULTS

| | Water Flood | | | Chemical Flood | | |
|---|---|---|---|---|---|---|
| Flood No. | Soi % Vp | Sor % Vp | Np/N % CIP | Soi % Vp | Sor % Vp | Np/N % OI |
| 1 | 65.3 | 41.4 | 37.2 | 41.4 | 39.6 | 4.1 |
| 2 | 60.5 | 32.5 | 47.5 | 32.5 | 26.0 | 20.0 |
| 3 | 62.5 | 35.5 | 43.5 | 35.5 | 29.5 | 16.9 |

Floods 2 and 3 recovered 20.0 and 16.9% respectively, of the crude oil remaining in place after termination of water flooding. These results show that the method of this invention will effectively emulsify, displace and recover significant quantities of crude oil which would not be recoverable by water-flooding alone.

What is claimed is:

1. A method of recovering crude oil from a subterranean reservoir having one or more injection means in fluid communication with one or more producing means which comprises injecting into said reservoir through said injection means an effective quantity of a solution of a fatty alcohol wherein the alcohol is selected from the group consisting of n-dodecyl, n-octyl and oleyl alcohols and mixtures thereof ranging in concentration from about 0.1 to about 10.0 weight percent of the injected solution and either a crude oil or a refined fraction of crude oil followed by an effective quantity of a solution comprising a soap and water wherein said soap is a sodium dodecyl sulfate ranging in concentration from about 0.05 to about 5.0 weight percent of the injected solution, said solutions combining with the crude oil present in the reservoir to form an oil-in-water emulsion, driving said solutions and emulsion through the reservoir by injection of a driving fluid and recovering the crude oil through said production means.

2. The method of claim 1 wherein the alcohol is n-dodecyl alcohol.

3. The method of claim 1 wherein the alcohol is n-octyl alcohol.

4. The method of claim 1 wherein the alcohol is oleyl alcohol.

* * * * *